R. STAHL.
TRANSMISSION MECHANISM.
APPLICATION FILED FEB. 7, 1918.

1,355,516.

Patented Oct. 12, 1920.
2 SHEETS—SHEET 1.

Inventor
Rodolphe Stahl
By Raymond A. Parker
Attorney

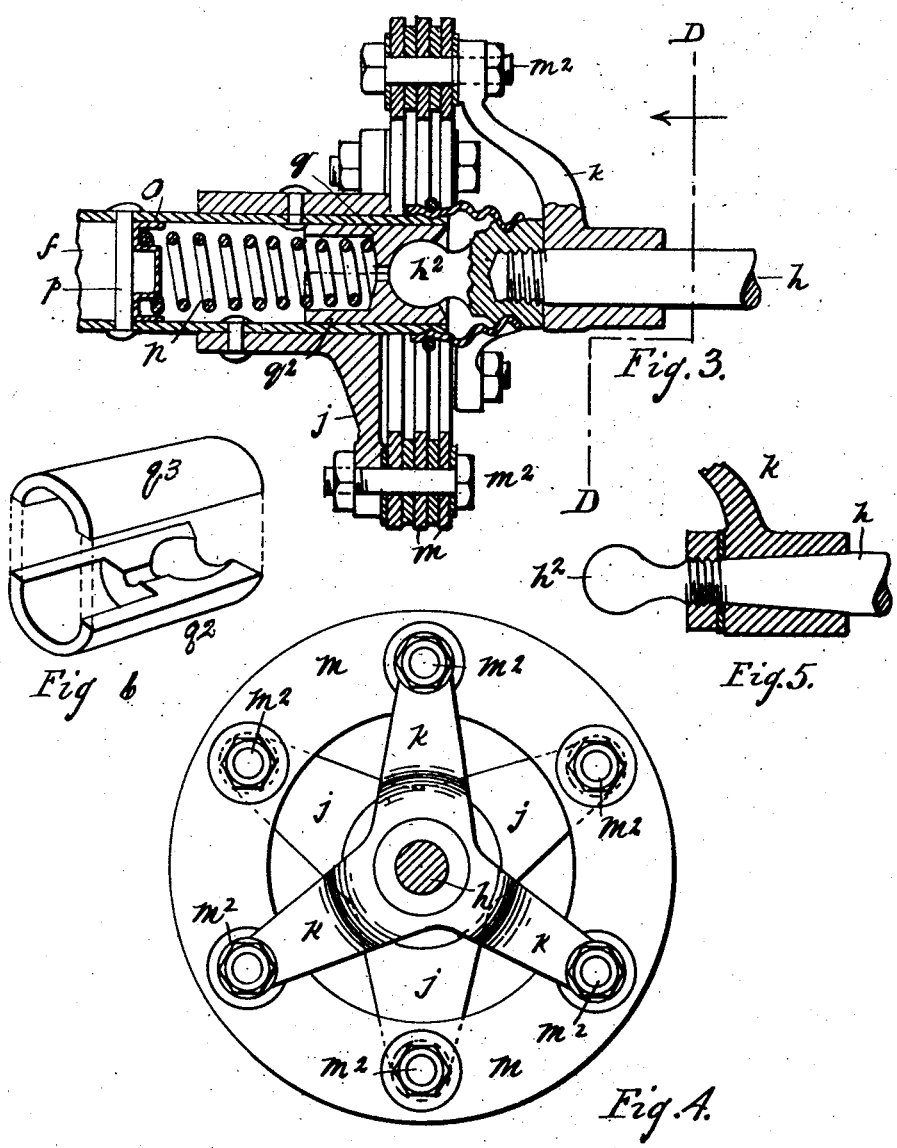

UNITED STATES PATENT OFFICE.

RODOLPHE STAHL, OF JACKSON, MICHIGAN.

TRANSMISSION MECHANISM.

1,355,516.  Specification of Letters Patent.  Patented Oct. 12, 1920.

Application filed February 7, 1918. Serial No. 215,877.

*To all whom it may concern:*

Be it known that I, RODOLPHE STAHL, a citizen of the United States, residing at Jackson, county of Jackson, State of Michigan, have invented a certain new and useful Improvement in Transmission Mechanism, and declare the following to be a full, clear, and exact description of the same, such as will enable others skilled in the art to which it pertains to make and use the same, reference being had to the accompanying drawings, which form a part of this specification.

My invention relates to transmission mechanism and a particular object of my improvements is to provide an improved transmission mechanism for automobiles and especially an improvement in the arrangement of the universal joints in said mechanism.

I secure this object in the apparatus illustrated in the accompanying drawing in which:

Fig. 3 is an enlarged sectional detail of one of the universal joints and adjacent parts.

Fig. 4 is an elevation looking from the right of Fig. 3.

Fig. 5 is a detail view partly in section of a modified construction.

Fig. 6 is a detail perspective view of the socket pieces for securing the shaft ends.

$a$ is the chassis of an automobile, $b$ is the front axle and $c$ the rear axle. $a^2$ is a spring connecting the chassis with the rear axle. $d$ is the engine, $e$ the change speed gearing and $f$ is the transmission shaft interposed between the change speed gearing $e$ and the gear shaft $c$. $g$ is a universal joint at one end of the shaft $f$ and adjacent to the change speed gearing $e$. $g^2$ is a similar universal joint at the other end of the transmission shaft $f$ adjacent to the rear axle $c$. $h$ is the shaft from which the power is transmitted to the transmission shaft $f$ and $i$ is the shaft to which the power is communicated by the transmission shaft $f$ to the rear axle $c$.

The universal joint at each end of the transmission shaft $f$ consists of a spider $k$ upon the driving shaft and a spider $j$ upon the driven shaft. In this particular instance the spiders have three arms, though they may have more, and the arms of one of said spiders is interposed angularly midway between the arms of the other of said spiders. $m$ are flexible bands, in this instance they are annular in shape and they are bound by bolts $m^2$ to the arms of the spiders $k$ and $j$ so as to form a flexible connection between said spiders through which power is conveyed from the arms of the spider on the driving shaft to the driven shaft through the arms of the spider thereon.

Upon the end of one of the shafts, as for instance, the driving shaft $h$ in Fig. 3, there is formed a ball $h^2$ which may be turned on a separate piece screwed or otherwise fixed to the shaft $h$, as shown in Fig. 3, or which may be directly formed upon the shaft, as shown in Fig. 5. This ball has its center on the axis of the shaft produced.

There is a socket formed on the other of said shafts as the driven shaft in Fig. 3, in which the ball $h^2$ fits so that the axes of the two united shafts intersect at the center of said ball. In the present instance, the shaft $f$ is a hollow tube and there is a socket piece $q$ therein made up of the two halves $q^2$ and $q^3$. These two halves are put together so as to form a socket and inclose the ball $h^2$ and then be inserted in the bore of the tube $f$. $p$ is a rivet or pin passing diametrically through the shaft $f$ and fixed therein. $o$ is a stamping or washer fitting in the interior of the shaft $f$ and resting against the pin $p$. $n$ is a compression spring, one end resting against the washer $o$, and the other against a socket piece $q$ and tending to force said socket piece outward.

Figure 1:
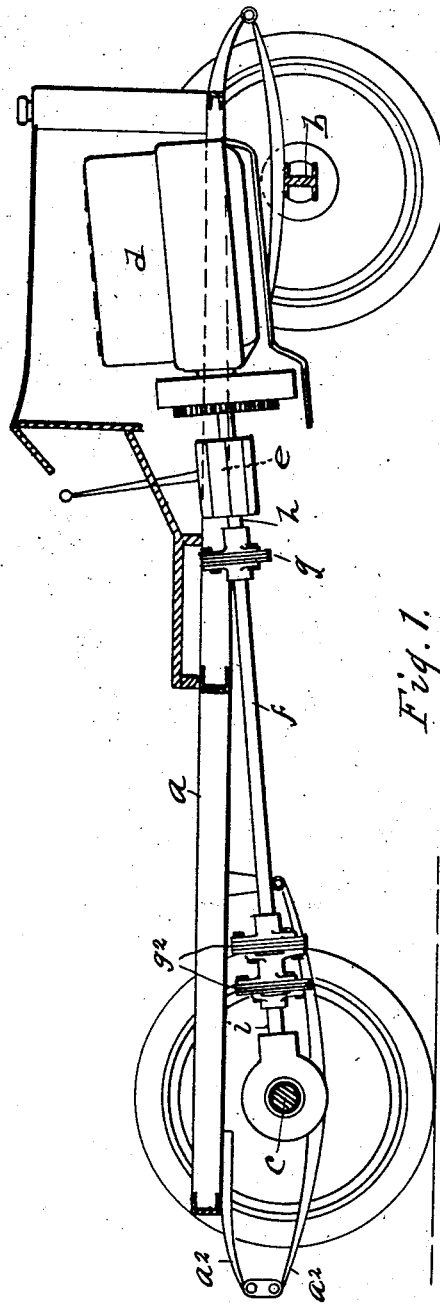
Figure 1 is an elevation of a transmission mechanism embodying my invention with so much of an automobile as is necessary to illustrate its connection therewith.
Figure 2:
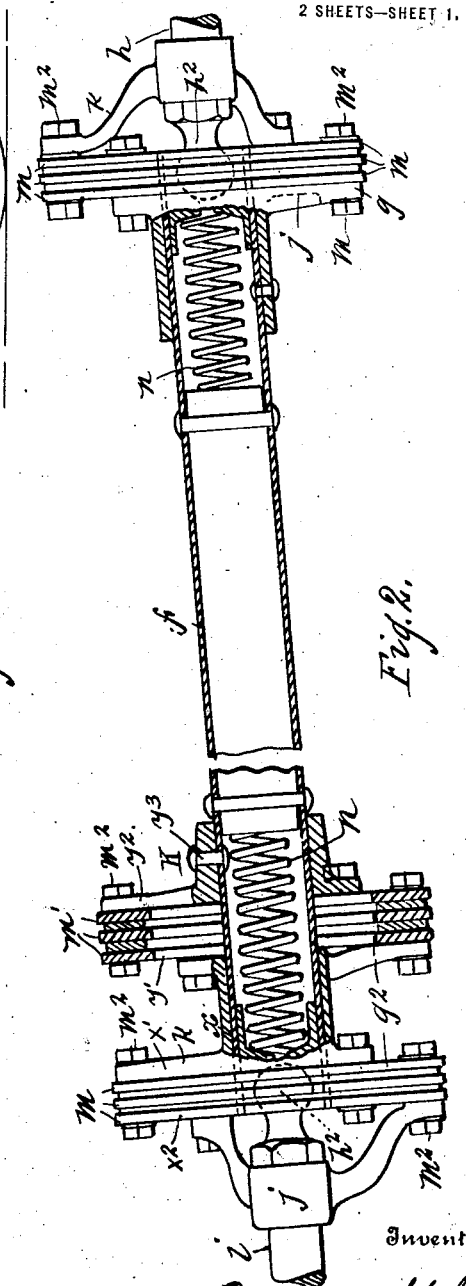
Fig. 2 is an elevation, mostly in section, of the transmission mechanism shown in Fig. 1.

It will be observed by reference to Figs. 1 and 2 that the transmission shaft $f$ is normally in an inclined position. For this reason the spring $n$ at the lower end of said shaft is made somewhat stronger than the corresponding spring at the upper end so as to sustain the greater weight of the shaft that would come on said spring because of the inclined position of the shaft. This is indicated in Fig. 2 by making the wire of noticeably greater diameter only it is not intended to indicate the dimensions of the wire accurately but simply to indicate that the tension is greater in the lower spring.

In universal joints employing the flexible connections $m$ there is a tendency for the shaft to get out of the center line between the two universal joints and when this occurs forces are generated by centrifugal action that tend to continually increase and injure or destroy the apparatus. By the above construction the intermediate shaft is accurately centered and the weight is removed from the flexible connections and the shaft is held in its central position so that the injurious and destructive centrifugal forces are avoided.

The springs $n$ $n$ carry the longitudinal forces with a yielding pressure and prevent any strain which would otherwise arise from such forces coming upon the flexible connections of the universal joints and hold the transmission shaft in a favorable support for accurate running.

I have shown my invention in connection with an inclined transmission shaft inasmuch as it has the special utility of supporting the uneven weight of the shaft due to such position, but my invention is obviously in its substantial nature applicable to all transmission mechanism embodying a universal joint of the kind described having flexible connections through which the force is transmitted.

In the automobile generally, transmission mechanism of this nature are required to be designed to allow for endwise motion in the connection in which is interposed the clutch. This endwise motion allows for the engagement and disengagement of the clutch. In the transmission shaft, as shown in the drawings, it allows for the endwise motion due to the springs and the oscillations due to the use upon a road. By the above construction it is not necessary that this endwise motion should be all accommodated by the flexible connection inasmuch as the socket pieces $q$ may move longitudinally of the shaft against the action of the springs $n$ $n$.

At the lower or rear end of the shaft $f$, I provide what may be appropriately styled a double arrangement of the spiders and flexible connecting means therebetween. In this instance a sleeve $x$ is free to slide upon the shaft $f$ which passes therethrough, and at the opposite ends of this sleeve the same carries the oppositely disposed inside spider portions $x'$, $y'$ between which latter and the opposing outside spider portions $x^2$, $y^2$ flexible members $m$, $m'$ (the same as hereinbefore described) are connected at $m^2$. The spider portion $y^2$ is made fast to the shaft $f$ through the medium of the securing means $y^3$, or its equivalent, so that it will be rotated with said shaft, and therefrom through the flexible connecting means $m'$, spider $y'$, sleeve $x$, spider $x'$, adjoining flexible connecting means $m$ and spider portion $x^2$ of the spider $j$, rotative movement will be transmitted to the shaft $i$. This duplication of the flexible connecting members, incident to the use of the two pairs of spider portions, enables the latter to give in a direction longitudinally of the shaft $f$ in keeping with the relatively long range of longitudinal sliding adjustment of the shaft in the sleeve $x$.

What I claim is:

1. In a transmission mechanism, the combination of a driving and a driven shaft, a universal joint connecting the ends of said shafts, said universal joint including a flexible longitudinal acting transmission member between eccentric points on said shafts, one of said shafts being hollow; a socket piece adapted to fit and reciprocate longitudinally in the hollow of said shaft, said socket piece being made in two halves, a ball on the other of said shafts adapted to engage in the socket of said socket piece.

2. In an automobile, a shaft having a universal joint at each end, said universal joints including a flexible tensional annular transmission part, said shaft being normally inclined to the horizontal, means for centering each end of said shaft at the center of its adjacent universal joint, and a spring at each end of said shaft acting on one part of said centering means, said springs acting on said shafts in opposite directions and the lower of said springs being the stronger for the purpose described.

3. In an automobile, a shaft inclined to the horizontal, a universal joint at the lower end of said shaft including a tensional flexible annular transmission part, means for centering said end of said transmission shaft, and a spring acting on said centering means and adapted to support the weight of said shaft that would otherwise come upon said joint because of the inclined position of said shaft.

4. The combination of a driving and a driven shaft, a spider rigidly secured upon one of said shafts at a distance from its end, a sleeve slidable upon said shaft between its end and said spider permitting said shaft to pass through the sleeve into centering relation to the other shaft, a spider upon said other shaft, and flexible members connecting each of said spiders with said sleeve, substantially as and for the purpose described.

5. The combination of a driving and a driven shaft, a spider rigidly secured upon one of said shafts at a distance from its end, a sleeve slidable upon said shaft between its end and said spider and having spider arms on each end, a spider upon the other of said shafts, flexible members connecting adjacent spiders, and means for centering said shafts one upon the other, substantially as and for the purpose described.

6. In an automobile, the combination of a power imparting shaft and the main transmission shaft of an automobile and the shaft receiving its power from said main transmission shaft, a universal joint at one end of said main transmission shaft joining the same to the power imparting shaft having means for carrying the longitudinal forces with yielding pressure, and a universal joint at the other end of said main transmission shaft joining the same to said power receiving shaft having means distinct from said first mentioned means to assist in carrying the longitudinal forces with yielding pressure, each of said universal joints including a flexible driving member between points of adjacent ends of said shafts.

In testimony whereof, I sign this specification.

RODOLPHE STAHL.